(12) United States Patent
Adhikari et al.

(10) Patent No.: US 11,438,519 B2
(45) Date of Patent: Sep. 6, 2022

(54) METHOD OF FAST ESTIMATION OF SCENE BRIGHTNESS AND OPTIMAL CAMERA EXPOSURE

(71) Applicant: SAMSUNG ELECTRONICS CO., LTD., Suwon-si (KR)

(72) Inventors: Soumyadarshi Adhikari, Bengaluru (IN); Prashant Kumar, Bengaluru (IN); Srinivasa Mysore Ravindra, Bengaluru (IN); Mahammadrafi Maniyar, Bengaluru (IN); Prasanth Kammampati, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/148,099

(22) Filed: Jan. 13, 2021

(65) Prior Publication Data

US 2021/0218874 A1 Jul. 15, 2021

(30) Foreign Application Priority Data

Jan. 13, 2020 (IN) .............................. 202041001529
Jan. 6, 2021 (IN) .............................. 202041001529

(51) Int. Cl.
*H04N 5/235* (2006.01)
*G06N 3/08* (2006.01)

(52) U.S. Cl.
CPC ............. *H04N 5/2353* (2013.01); *G06N 3/08* (2013.01); *H04N 5/2351* (2013.01)

(58) Field of Classification Search
CPC ....... H04N 5/2353; H04N 5/2351; G06N 3/08
See application file for complete search history.

(56) References Cited

U.S. PATENT DOCUMENTS

| 5,452,047 A | 9/1995 | Hesse et al. |
| 7,173,663 B2 | 2/2007 | Skow et al. |
| 8,964,062 B1 | 2/2015 | Neglur |
| 10,530,991 B2 * | 1/2020 | Wang ................... H04N 5/2351 |

(Continued)

FOREIGN PATENT DOCUMENTS

| CN | 105430268 B | 2/2019 |
| CN | 109889731 A | 6/2019 |

(Continued)

OTHER PUBLICATIONS

Sze, V., et al., "Efficient Processing of Deep Neural Networks: A Tutorial and Survey", arXiv:1703.09039v2, [cs.CV], Aug. 13, 2017, pp. 1-32.

(Continued)

*Primary Examiner* — Ahmed A Berhan
(74) *Attorney, Agent, or Firm* — Sughrue Mion, PLLC

(57) ABSTRACT

A method and an apparatus for adjusting an optimal exposure of a camera are provided. The method may include: receiving a camera start command to activate a camera of an electronic device; capturing an image frame of a scene by the camera; obtaining an Exposure Brightness Response (EBR) of the camera; providing the EBR and the image frame as an input to a pre-trained neural network specific to the camera; and determining a plurality of exposure parameters of the camera and a mean pixel brightness (MPB) by using the pre-trained neural network.

17 Claims, 10 Drawing Sheets

(56) References Cited

U.S. PATENT DOCUMENTS

| | | | |
|---|---|---|---|
| 10,666,873 B2* | 5/2020 | Bouzaraa | G06T 5/009 |
| 2003/0020826 A1 | 1/2003 | Kehtarnavaz et al. | |
| 2018/0220061 A1 | 8/2018 | Wang et al. | |
| 2018/0241929 A1 | 8/2018 | Bouzaraa et al. | |
| 2018/0268261 A1 | 9/2018 | El Dokor | |
| 2018/0285679 A1 | 10/2018 | Amitay | |
| 2019/0043178 A1 | 2/2019 | Chen et al. | |
| 2020/0265567 A1 | 8/2020 | Hu et al. | |
| 2020/0293803 A1 | 9/2020 | Wajs et al. | |

FOREIGN PATENT DOCUMENTS

| | | |
|---|---|---|
| CN | 110602384 A | 12/2019 |
| CN | 109547701 B | 7/2021 |
| KR | 10-2010-0125983 A | 12/2010 |

OTHER PUBLICATIONS

Muehlebach, M., "Camera Auto Exposure Control for VSLAM Applications", Studies on Mechatronics, Swiss Federal Institute of Technology Zurich, Autumn Term 2010, pp. 1-57 (67 pages).

Communication dated Jan. 4, 2022 issued by the Indian Patent Office in Indian Application No. 202041001529.

International Search Report (PCT/ISA/210) dated Apr. 27, 2021 by the International Searching Authority in International Patent Application No. PCT/KR2021/000495.

Written Opinion (PCT/ISA/237) dated Apr. 27, 2021 by the International Searching Authority in International Patent Application No. PCT/KR2021/000495.

* cited by examiner

METHOD OF FAST ESTIMATION OF SCENE BRIGHTNESS AND OPTIMAL CAMERA EXPOSURE

CROSS-REFERENCE TO RELATED APPLICATION(S)

This application is based on and claims priority under 35 U.S.C. § 119 to Indian Provisional Application No. 202041001529 filed on Jan. 13, 2020, and Indian Complete Application No. 202041001529, filed on Jan. 6, 2021, in the Indian Intellectual Property Office, the disclosures of which are incorporated by reference herein in their entireties.

BACKGROUND

1. Field

The disclosure relates to controlling a launch time and luminance exposure of a camera and determining brightness of a scene captured by the camera, and more specifically relates to a method and an apparatus for reducing the launch time of the camera and controlling the camera to have an optimal exposure time.

2. Description of Related Art

A camera is an important component of a smart phone and has been developed to provide better performance. Research and development for improving the camera performance among smart phone manufacturers have been actively conducted. One of the major areas to improve the camera performance is related to luminance exposure settings.

The exposure of the camera effects brightness of an image captured by the camera. The exposure of the camera has a plurality of parameters associated with the luminance exposure and the parameters may be referred to as exposure settings. Thus, in order to obtain a well exposed image, the exposure settings need to be optimized for the camera. However, an exposure hunting problem may occur if the exposure parameters are miscalculated. The term "exposure hunting" refers to a condition in which an optimal exposure calculation is repeated to search for an accurate exposure because the settings are not suitable for obtaining the well exposed image, and as a result the optimal exposure is frequently changed for a given scene. When the exposure hunting occurs, the camera continues to focus in and out. Another problem is that the brightness of consecutive captured images changes frequently.

The related art discloses calculating the exposure parameters without any problem of exposure hunting. But in the conventional method the time required for achieving the optimal exposure is approximately 250 ms-300 ms. A related technology solves the problem of the extra time required for achieving the optimal exposure by using exposure settings which are obtained from a previous camera operation, wherein the time is reduced to 0 ms but the technology has the exposure hunting issue for initial frames when a lighting condition changes between previous and current camera operations. So the related technology does not solve the exposure hunting problem.

Further, since the related technology spends a long time in determining the exposure settings, an image processor runs for a longer time and uses much computational power due to the exposure hunting. Hence the image processor is not available for other applications and therefore efficiency and functionality of the image processor are reduced.

In a related technology in which the exposure hunting time is 0n s, the accurate exposure for obtaining a well exposed image is not obtained and hence the images have to be clicked several times, and therefore the lifespan of the camera and other hardware components of the camera is reduced. The above mentioned disadvantages not only affect the camera of an electronic device, but also affect the battery and the processor of the electronic device.

Another related problem occurs when a camera is used as an alternative to a light sensor, wherein image frames captured by the camera are processed and scene brightness (lux) is calculated. Thus instead of the light sensor, camera data may be used to generate light sensor data. So, for any application which obtains scene brightness from the camera, the electronic device may open the camera very frequently (for example, every 5 sec). However, to generate accurate scene brightness (lux), the scene brightness has to be calculated after exposure stabilization, which means that for determining scene brightness, a brightness calculator has to skip 5-10 image frames depending on exposure stabilization strategy.

So, approximately there is 250 ms delay in exposure stabilization process, and it is a significant waste of power as the scene brightness is determined every 5 sec. Thus the camera life and the battery life are reduced as the image processors is over utilized. Further, as exposure stabilization takes approximately 250 ms, performance of obtaining a scene brightness value is also affected. For applications depending on scene brightness such as an automatic brightness control application, 250 ms is a significantly delay as these applications are executed very frequently (every 5-10 sec).

Thus, there is a need to provide a method and a device for determining optimal exposure settings and scene brightness in a relatively short time.

SUMMARY

In accordance with an aspect of the disclosure, there is provided a method of controlling a camera in an electronic device, the method including: receiving a camera start command to activate the camera of the electronic device; capturing an image frame of a scene by the camera; obtaining an Exposure Brightness Response (EBR) of the camera; providing the EBR and the image frame as an input to a pre-trained neural network specific to the camera; and determining a plurality of exposure parameters of the camera and a mean pixel brightness (MPB) by using the pre-trained neural network.

The method may further include: applying the plurality of exposure parameters to the camera for capturing a next image frame.

The method may further include: determining the EBR before receiving the camera start command.

The determining the EBR may include: applying, to the camera, each of a plurality of exposure values supported by the camera; capturing an image for each of the plurality of exposure values applied to the camera; determining a mean pixel brightness (MPB) value for the image captured for each of the plurality of exposure values applied to the camera; and determining the EBR of the camera as a function of the plurality of exposure values applied to the camera and the corresponding MPB value for each captured image.

The plurality of exposure parameters may include a shutter speed of the camera, an analog and digital gain of the camera, and a lens aperture of the camera.

Light sensing properties (LSP) of the camera may be provided as the input to the pre-trained neural network to determine the plurality of exposure parameters and the MPB.

The LSP may include at least one of a refractive index of a lens of the camera, a pixel size of an image sensor of the camera, a signal-to-noise ratio (SNR) of an analog-to-digital converter (ADC) in the camera, a minimum exposure and a maximum exposure of the camera, a minimum international organization for standardization (ISO) value and a maximum ISO value of the camera, a minimum aperture and a maximum aperture of the camera, and an initial exposure applied to the camera.

The method may further include: determining the plurality of exposure parameters by using an Automatic Exposure Control (AEC) method; determining a difference value between the plurality of exposure parameters determined by the pre-trained neural network and the plurality of exposure parameters determined by using the AEC method; determining whether the difference value is greater than a pre-defined threshold value; and adjusting the pre-trained neural network to adjust the plurality of exposure parameters in response to determining that the difference value is greater than the pre-defined threshold value.

In accordance with another aspect of the disclosure, there is provided an electronic device for determining an optimal camera exposure, the electronic device including: at least one memory configured to store one or more computer readable instructions; a camera configured to: receive a camera start command to activate the camera; and capture an image frame of a scene; and a processor configured to execute the one or more instructions to: obtain an Exposure Brightness Response (EBR) of the camera; apply the EBR and the captured image frame to a neural network specific to the camera; and determine a plurality of exposure parameters of the camera and a mean pixel brightness (MPB) using the neural network specific to the camera.

The processor may be further configured to execute the one or more instructions to: apply the plurality of exposure parameters to the camera for capturing a next image frame, wherein the camera may further configured to capture the next image frame based on the plurality of exposure parameters.

The processor may be further configured to execute the one or more instructions to: determine the EBR of the camera before receiving the camera start command to activate the camera.

The processor may be further configured to execute the one or more instructions to: apply to the camera, each of a plurality of exposure values supported by the camera; capture an image for each of the plurality of exposure values; determine a mean pixel brightness (MPB) value for the image captured for each of the plurality of exposure values applied to the camera; and determine the EBR of the camera as a function of the plurality of exposure values applied to the camera and the corresponding MPB value for each captured image.

The plurality of exposure parameters may include a shutter speed of the camera, an analog and digital gain of the camera and a lens aperture of the camera.

The processor may be further configured to execute the one or more instructions to: provide light sensing properties (LSP) of the camera as an input to the pre-trained neural network; and determine the plurality of exposure parameters and the MPB through the pre-trained neural network.

The LSP may include a refractive index of a lens of the camera, a pixel size of an image sensor of the camera, a signal-to-noise ratio (SNR) of an analog-to-digital converter (ADC) in the camera, a minimum exposure and a maximum exposure of the camera, a minimum international organization for standardization (ISO) value and a maximum ISO value of the camera, a minimum aperture and a maximum aperture of the camera, and an initial exposure applied to the camera.

The processor may be further configured to execute the one or more instructions to: determine the plurality of exposure parameters by using an Automatic Exposure Control (AEC) method; determine a difference value between the plurality of exposure parameters determined by the pre-trained neural network and the plurality of exposure parameters determined by using the AEC method; determine whether the difference value is greater than a pre-defined threshold value; and adjust the pre-trained neural network to adjust the plurality of exposure parameters in response to determining that the difference value is greater than the pre-defined threshold value.

In accordance with another aspect of the disclosure, there is provided an electronic device for determining an optimal camera exposure, the electronic device including: a camera configured to capture an image frame of a scene; at least one memory configured to store one or more computer readable instructions, and a convolutional neural network that is trained based on a configuration of the camera; and a processor configured to execute the one or more instructions to: obtain an Exposure Brightness Response (EBR) of the camera; apply the EBR and the captured image frame to the convolutional neural network; and determine a plurality of first exposure parameters of the camera through the convolutional neural network by inputting the EBR and the captured image frame to the convolutional neural network; determine a plurality of second exposure parameters of the camera by applying an Automatic Exposure Control (AEC) method to the captured image frame; adjust the convolutional neural network in response to determining a difference between the plurality of first exposure parameters and the plurality of second exposure parameters is greater than a pre-defined threshold value, and determine a plurality of third exposure parameters through the adjusted convolutional neural network, as optimal exposure parameters.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
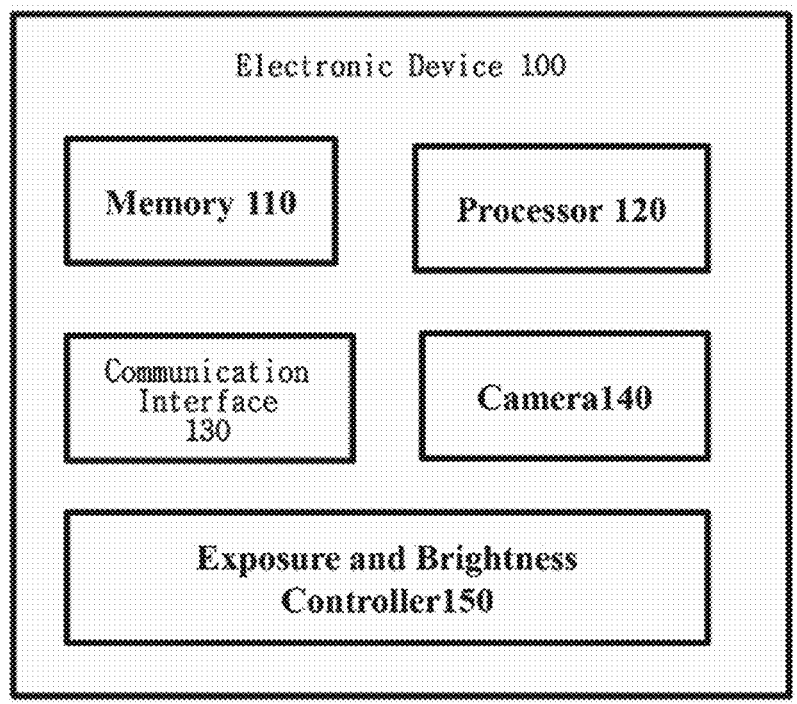
FIG. 1A illustrates a block diagram of an electronic device for determining optimal exposure and scene brightness, according to an embodiment.

Embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hard-wired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Likewise, the blocks of the embodiments may be physically combined with more complex blocks without departing from the scope of the disclosure.

One or more embodiments provide a method and a system for reducing a camera launch time by reducing a camera exposure setting time. The exposure setting time is reduced by determining an optimal exposure by providing an image frame captured by the camera and a determined Exposure Brightness Response (EBR) as inputs to a pre-trained convolutional neural network (CNN).

Unlike conventional or related art, one or more embodiments of the present disclosure provide a method of using only a single image frame for determining the optimal exposure. Since only a single image frame is used, the exposure settings are applied to the camera from the very next frame. This significantly reduces a delay that occurs in loading the camera. Further, since the optimal exposure determination requires only a single image, hardware units are also efficiently utilized. However, a method and an apparatus according to an embodiment of the present disclosure are not limited to using only a single image frame, and a plurality of image frames may be used to determine the optimal exposure.

The embodiments herein further provide a method for determining a scene brightness (which is indicated by a brightness measurement unit, lux) in the camera after the camera launches. The scene brightness is determined using the CNN, wherein the CNN is trained with the camera parameter EBR and a single image frame.

Since a processing time of an image processor is reduced, the lifespan of the camera according to the embodiments is also increased as compared with conventional cameras. Further the lifespans of the image processor and a battery in an electronic device including the camera, is also increased as overuse of the battery and the image processor is reduced.

FIG. 1A illustrates a block diagram of an electronic device 100 for fast estimation of scene brightness and optimal exposure of a camera in the electronic device 100, according to an embodiment of the disclosure. The electronic device 100 may be, for example, but not limited, to a social robot, a smart watch, a cellular phone, a smart phone, a Personal Digital Assistant (PDA), a tablet computer, a laptop computer, a music player, a video player, an Internet of things (IoT) device, a smart speaker, an Artificial intelligent (AI) device or the like.

In an embodiment, the electronic device 100 includes a memory 110, a processor 120, a communication interface 130, a camera 140 and an exposure and brightness controller 150. The exposure and brightness controller 150 may be integrated into the processor 120, and computer readable instructions for operating the exposure and brightness controller 150 may be stored in the memory 110.

In an embodiment, the memory 110 is configured to store an image captured by the camera 140, an Exposure Brightness Response (EBR) of the camera 140, and a convolutional neural network that is trained based on a configuration (e.g., a resolution, a sensitivity, an exposure control type, a shutter type, a shutter speed, etc.) of the camera 140. The memory 110 also stores instructions to be executed by the processor 120. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. In certain examples, a non-transitory storage medium may store data that can, over time, change (e.g., in Random Access Memory (RAM) or cache). The memory 110 can be an internal storage unit or it can be an external storage unit of the electronic device 100, a cloud storage, or any other type of external storage.

In an embodiment, the processor 120 communicates with the memory 110, the communication interface 130, the camera 140 and the exposure and brightness controller 150. The processor 120 is configured to execute instructions stored in the memory 110 and to perform various processes. The processor 120 may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In an embodiment, the communication interface 130 is configured to communicate internally between internal hardware components and with external devices via one or more networks. The communication interface 130 includes an electronic circuit that enables wired or wireless communication.

The camera 140 of the electronic device 100 captures images and videos. The camera 140 may perform as a light sensor for determining scene brightness, and may include an image sensor, such as for example, a charge-coupled device (CCD) sensor, or a complementary metal oxide semiconductor (CMOS) sensor. In an embodiment, the camera 140 receives a start command to activate the camera 140. Upon receiving the start command, the camera 140 is activated and upon receiving an image capture command (or recognizing that a camera shutter button is pressed), captures a scene. The scene captured by the camera 140 may be an image frame or a video frame.

In an embodiment, the exposure and brightness controller 150 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The exposure and brightness controller 150 may be an artificial intelligence (AI) accelerator or a deep learning accelerator, and may be implemented as a separate chip, or a peripheral of the processor 120.

In an embodiment, the exposure and brightness controller 150 is configured to receive the image frame captured by the camera 140. The exposure and brightness controller 150 may receive a video frame. After receiving the image, the exposure and brightness controller 150 receives a previously determined Exposure Brightness Response (EBR) of the camera 140. The EBR is determined based on all exposure values supported by the camera 140 and a mean pixel brightness associated with the different exposure values.

According to a setting of the exposure of the camera 140, a brightness of an image captured by the camera 140 is determined. The plurality of parameters associated with the exposure include a exposure time (i.e., a length of time during which an image sensor inside the camera is exposed to light), a shutter speed, an international organization for standardization (ISO) value of the camera 140 indicating a sensitivity to light, an analog and/or digital gain of the camera 140, and a lens aperture. In the present disclosure, these parameters are referred to as luminous exposure settings, luminous exposure setting parameters, exposure settings, exposure.

In an example, if the exposure setting of the camera 140 is high then the image captured by the camera 140 is overexposed, similarly if the exposure settings are low, then the image captured by the camera 140 is underexposed. For example, for a specific scene, the exposure time T ms is the optimal exposure time, such that a balanced brighter and darker region of the scene is captured. Then for the same scene without changing any other camera settings, if the exposure time is increased to (T+t1) ms, then brighter regions will either become very bright or some of the brighter regions will be white. This situation is called overexposed. Similarly if the same scene is captured by decreasing the exposure time to (T−t2) ms then darker regions may become black, and this situation is called underexposed. Thus it is necessary to determine an optimal exposure for the camera 140 in order to have a balanced image.

The EBR is the exposure brightness response of the camera 140. The EBR of any camera is a fixed value and cameras having the same configuration may have same the EBR. The configuration of the camera 140 may include, but is not limited to, a resolution, a sensitivity (e.g., ISO100), an exposure control type, an exposure mode, a startup time, a shutter type, a shutter speed, an image sensor type, a lens type, and an aspect ratio. The EBR is defined as a set of (Exposure, Mean Pixel Brightness (MPB)) pair. The exposure in the (exposure, MPB) pair include all the exposure values supported by the camera 140 for which the EBR is to be determined. The MPB is a function of the scene captured by the camera 140 and the exposure of the camera 140.

The EBR is defined by equation 1 as follows. In equation 1, $EBR_{Camera-x}$ denotes the EBR of a camera X. In the present embodiment the camera X is the camera 140. The EBR of the camera 140 is represented as a function of the exposure and the MPB. Further the MPB is represented a function of the camera exposure when the scene is constant.

$$EBR_{Camera-x} = \{(Exposure_i, MPB_i)\} \qquad \text{Equation 1}$$

$MPB_i = f(Exposure_i)$ when Scene is Constant & i=0, 1, 2 . . . No. of exposure supported As shown in equation 1, EBR are measurements of a particular camera, which indicate how the particular camera responds under various exposure settings when a captured scene is constant along with the optimal exposure.

The exposure and brightness controller 150 after receiving the captured image frame and the EBR, sends the image frame captured by the camera 140 and the determined EBR of the camera 140 to a pre-trained CNN model. The pre-trained CNN model uses the image frame captured by the camera 140 and the EBR and provides a plurality of parameters associated with the optimal exposure of the camera 140 and the scene brightness. In an embodiment, the plurality of parameters associated with the optimal exposure of the camera 140 include a shutter speed and/or a exposure time, a lens aperture, and an ISO value of the camera 140 indicating a sensitivity to light, an analog and/or digital gain of the camera 140. The scene brightness is a mean pixel brightness (MPB) of the scene captured in the image frame and is based on optimal exposure and hereafter is referred to as optimal MPB.

Although the FIG. 1A shows various hardware components of the electronic device 100 but the embodiments of the present disclosure are not limited thereto, and the electronic device 100 may include a less or more number of components. One or more components may be combined together to perform the same or substantially the same function of determining an optimal exposure and maintaining scene brightness by the electronic device 100.

Figure 1B:
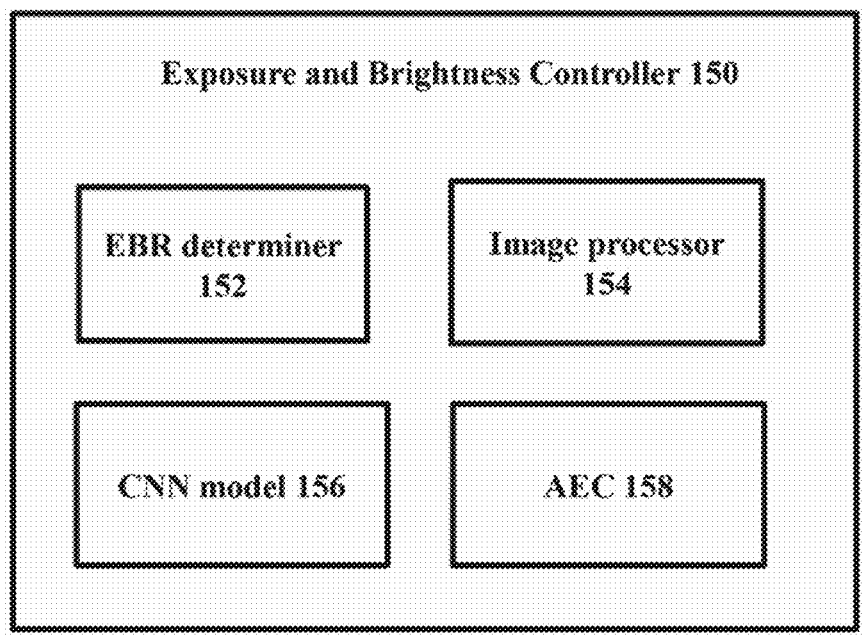
FIG. 1B illustrates a block diagram of an exposure and scene brightness controller, according to an embodiment.

FIG. 1B illustrates a block diagram of the exposure and brightness controller 150 for determining the optimal exposure and optimal MPB, according to an embodiment of the disclosure.

In an embodiment, the exposure and brightness controller 150 includes, an EBR determiner 152, image processor 154, the pre-trained CNN model 156, and an Auto Exposure Control (AEC) 158.

In an embodiment, the EBR determiner 152 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

Figure 2A:
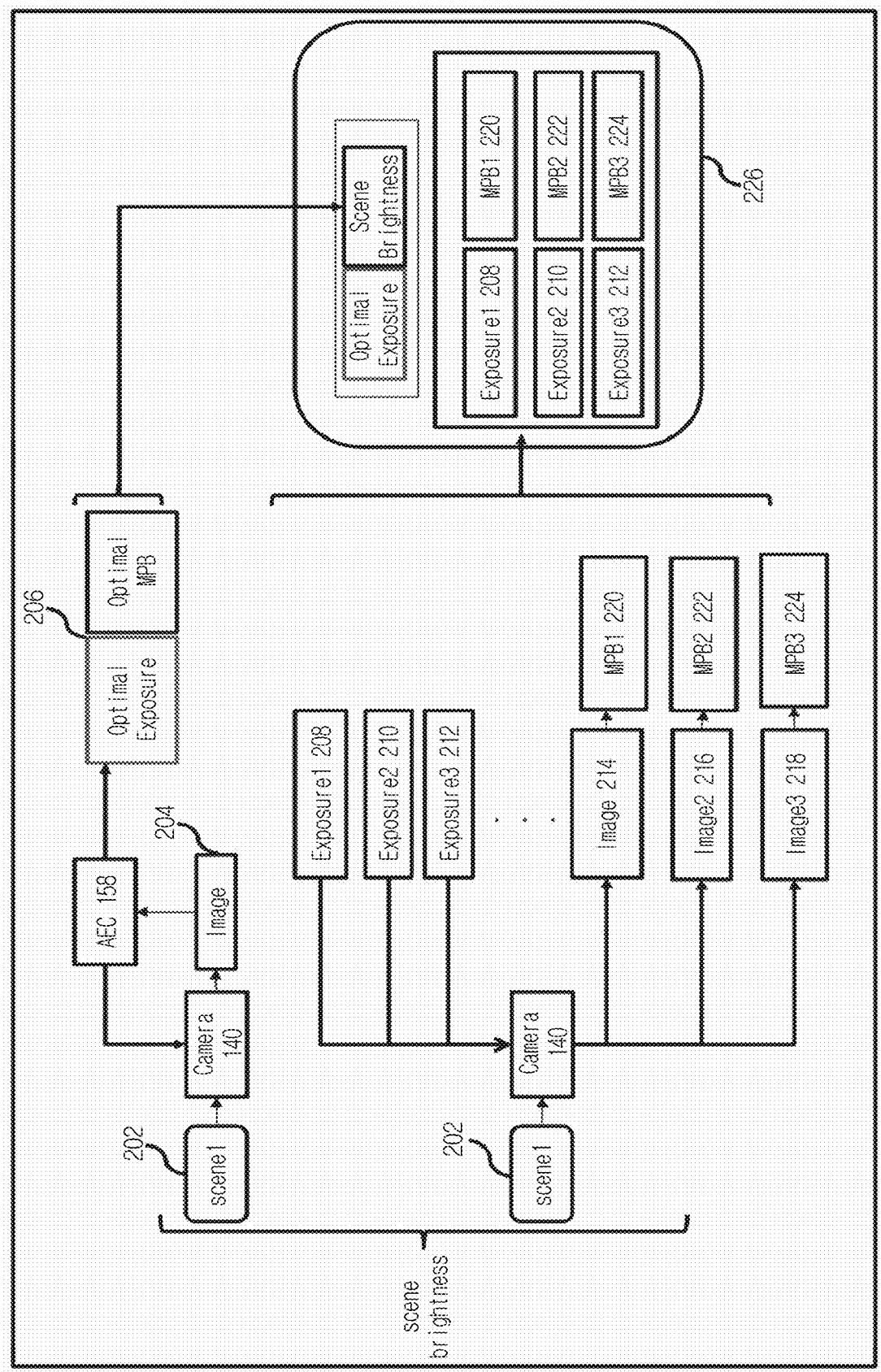
FIG. 2A and FIG. 2B are a schematic diagram illustrating determination of a exposure brightness response (EBR), according to an embodiment.

In an embodiment, the EBR determiner 152 is configured to determine the EBR of the camera 140 based on the exposure values supported by the camera 140 as shown in FIG. 2A. The EBR determiner 152 creates a table including a plurality of pairs of exposure and their corresponding mean pixel brightness. The table is shown in FIG. 2A.

In an embodiment, the EBR is pre-determined and is specific for a similar type of the camera 140. For example if the specification of the camera 140 is similar to specification of a camera of another electronic device and if the EBR of the camera in the other electronic device is determined, then in such a case, the EBR determiner 152 uses the EBR determined by the electronic device and sends to the pre-trained CNN model for determining the optimal exposure and the optimal MPB.

In another embodiment, the EBR determiner 152, determines the EBR of the camera 140 in advance, even before receiving the request to activate the camera 140.

Once the camera 140 captures the scene in the image frame, then the EBR determiner 152 sends the already determined EBR to the CNN.

In an embodiment, the output from the EBR determiner 152 and the output from the image processor 154 which is the captured image frame are sent as an input to the pre-trained CNN model 156.

The pre-trained CNN model 156 uses the EBR and the captured image for determining the plurality of parameters associated with the optimal exposure of the camera 140 and the optimal MPB for the captured image. The optimal exposure settings are then applied to the camera 140 by the AEC 158 and the well exposed image is obtained.

In an embodiment the CNN model 156 is trained previously before receiving the input to activate the camera 140. The CNN model 156 is trained with the previously determined EBR and a plurality of images captured previously by the camera 140.

Thus the above method of determining an optimal exposure using only a single frame reduces the time required for launching the camera 140 significantly. Further since the optimal MPB is determined after determination of the optimal exposure, thus the time required for determining the optimal MPB is also reduced.

In an embodiment, the image processor 154 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the AEC 158 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The AEC 158 may perform an automatic exposure control or automatic exposure algorithm. Specifically, the AEC 159 may obtain a captured image, measure a first contrast in a focus area of the captured image, apply a predetermined (relatively small) amount of change to a focusing distance of the camera 140, measure a second contrast in the focus area after applying the change to the focusing distance, and determine a difference between the first contrast and the second contrast, and set a new focusing distance based on the difference between the first contrast and the second contrast.

The above described pre-trained CNN 156 and/or at least one of the plurality of modules/components may be implemented through an artificial intelligence (AI) model. A function associated with AI may be performed through memory 110 and the processor 120. The one or a plurality of processors controls the processing of the input data in accordance with a predefined operating rule or AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/o may be implemented through a separate server/system.

The AI model may be configured with a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 1B shows various hardware components of the exposure and brightness controller 150 but embodiments of the present disclosure are not limited thereto. For example, the exposure and brightness controller 150 may include a less or more number of components. One or more components can be combined together to perform the same or substantially the same function of determining an optimal power and an optimal MPB.

FIG. 2A is a schematic diagram illustrating determination of EBR according to an embodiment. As seen in FIG. 2A, element 202 refers to a scene which is being viewed by the camera 140 (e.g., a preview image, or a field of view of the camera 140). Element 204 is an image of the scene 202 captured by the camera 140. In an embodiment, for determining the EBR of the camera 140, the exposure and brightness controller 150 may calculate an intermediate optimal exposure by using the AEC 158 in operation 206 as shown in FIG. 2A.

The camera 140 may be configured based on each of a plurality of exposure settings supported by the camera 140. As seen in FIG. 2A, a first exposure setting 208, a second exposure setting 210 and a third exposure setting 212 are the different exposure settings applied to the camera 140. For each exposure setting the image is obtained. Image frame 214 is obtained when the camera 140 has the first exposure setting 208, image frame 216 is obtained when the camera 140 has the second exposure setting 210, and image frame 218 is obtained when the camera 140 has the third exposure setting 212. For each image frame, a mean pixel brightness is calculated. For image frame 214, the MPB is 220, for image frame 216 the MPB is 222 and for image frame 218 the MPB is 224.

The EBR is the table 226 which includes all the values of the exposure and their corresponding MPB including the optimal exposure and optimal MPB pair.

Figure 2B:
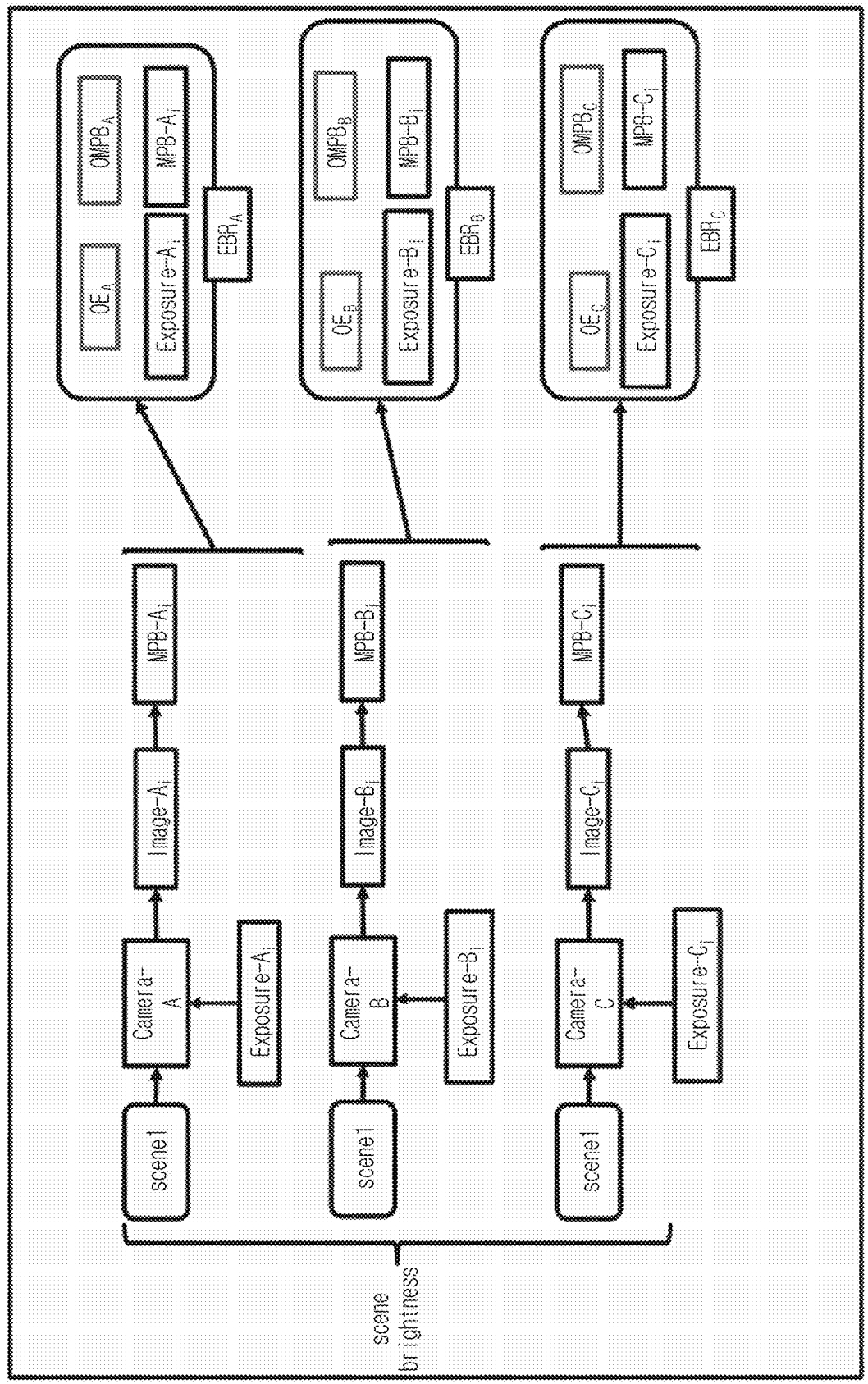

FIG. 2B is a schematic diagram, illustrating a scenario, where different cameras have different EBR, according to an embodiment of the present disclosure.

As seen in FIG. 2B, a same scene 1 is being captured by camera A, camera B and camera C with different exposure settings Ai, Bi and Ci supported by the respective cameras, where i may be any value of the exposure supported by the respective camera. The image obtained by camera A is Ai, with camera B is Bi and with camera C is Ci. Similarly MPB for each image captured with different exposure value is MPB-Ai for camera A, MPB-Bi for camera B and MPB-Ci for camera C.

Further, the intermediate optimal exposure for cameras A-C is determined by the AEC 158. The intermediate optimal exposures for camera A, camera B, and camera C are $OE_A$, $OE_B$, and $OE_C$, respectively. The optimal MPBs for the scene for camera A, camera B, and camera C are $OMPB_A$, $OMPB_B$, and $OMPB_C$, respectively.

Thus as seen in FIG. 2B, for each camera the EBR is different and has a function of the exposure and MPB pair including the intermediate optimal exposure and optimal MPB pair.

Figure 3:
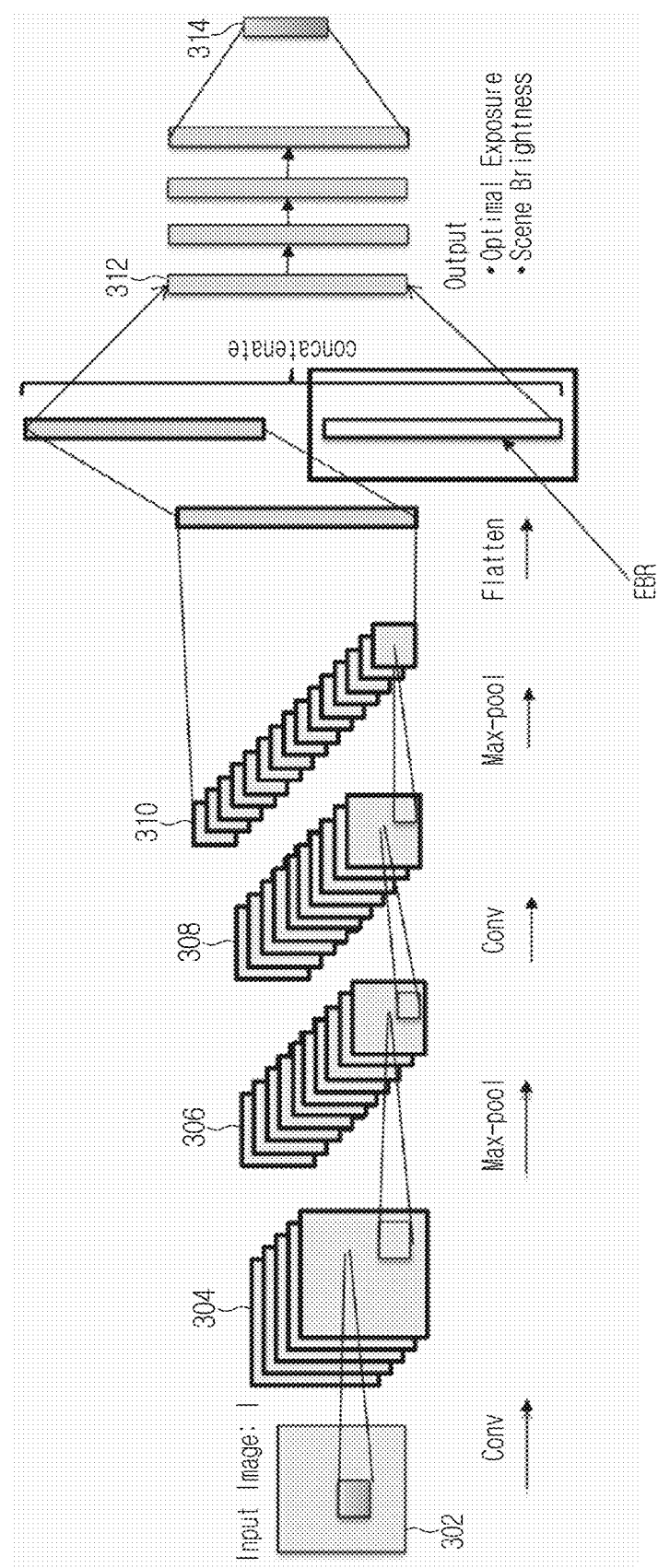
FIG. 3 is a schematic diagram illustrating an architecture of a convolutional neural network (CNN) according to an embodiment.

FIG. 3 is a schematic diagram, illustrating an architecture of the CNN 156, according to an embodiment.

As seen in FIG. 3, the image frame is provided as the input to an input layer of the CNN 156 in operation 302. Further elements 304, 306, 308 and 310 represent different sets of convolution layers. The CNN 156 is trained with the EBR in operation 312, as shown in FIG. 3. For example, the image frame is processed through the convolution layers 304, 306, 308 and 310, and then is concatenated with the EBR in operation 312. In operation 314, an output layer of the CNN 156 outputs the optimal exposure and optimal MPB.

In an embodiment, the CNN 156 may be trained with Light Sensing Properties (LSP) of the camera 140. The LPS of a specific type of camera module affects the amount of light an image sensor of the camera 140 may sense and produce a digital image. The LSPs includes a refractive index of a lens of the camera 140, a pixel size of the image sensor of the camera 140, a Signal to Noise ratio (SNR) of an Analog to Digital Converter (ADC) in the camera 140, a min/max exposure time of the camera 140, a min/max ISO of the camera 140, a min/max aperture of the camera 140, and an initial exposure applied to the camera 140 for capturing the image.

Figure 4:
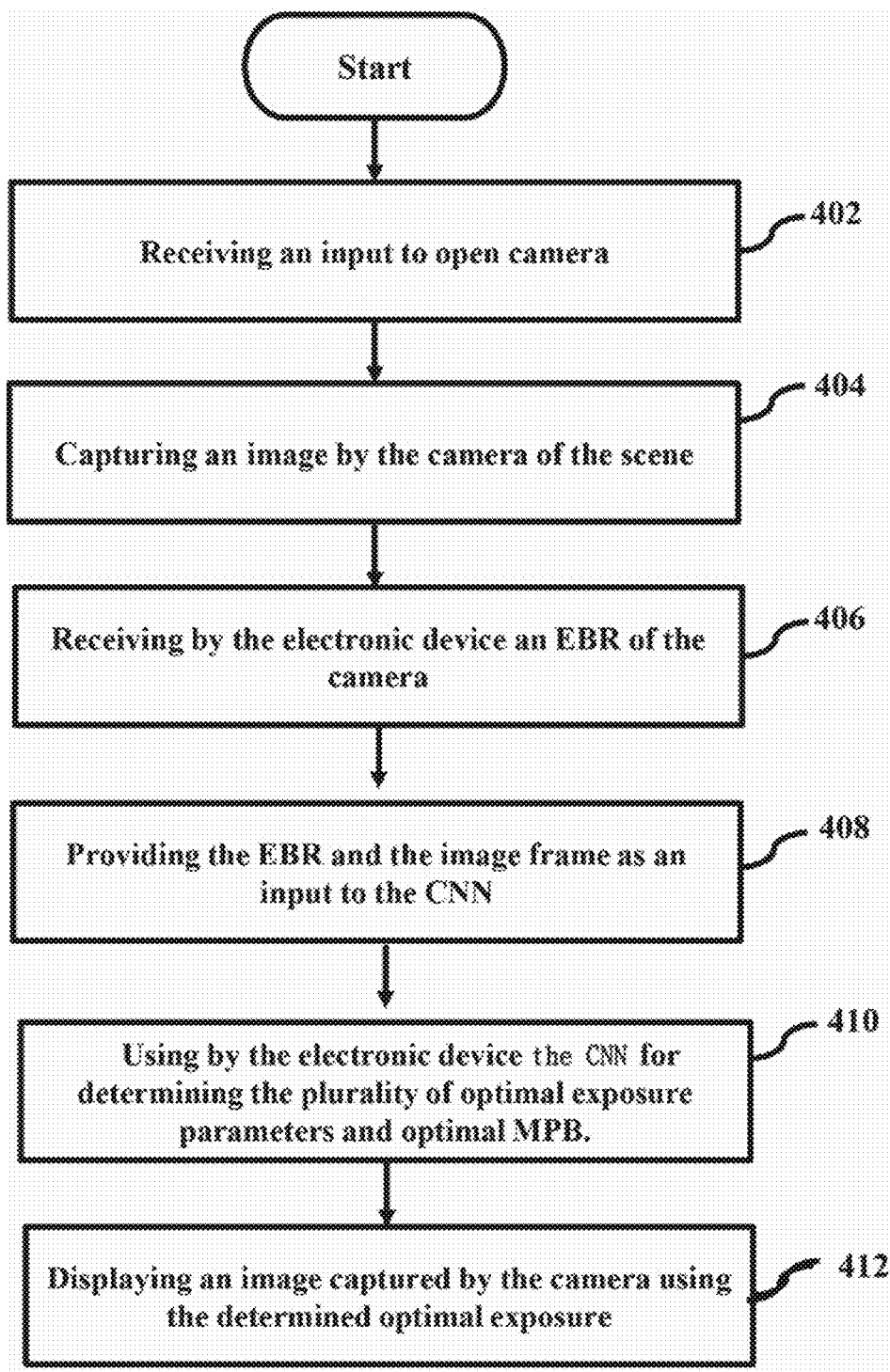
FIG. 4 is a flow diagram, illustrating a flow of determining optimal exposure and scene brightness, according to an embodiment.

FIG. 4 is a flow diagram illustrating a method of determining optimal exposure and optimal MPB, according to an embodiment.

In operation 402, the camera 140 of the electronic device 100 receives a user input (e.g., a camera application start command) to open the camera. In an embodiment, the user may open or launch the camera application available on the electronic device 100. In operation 404, the camera 140 is opened and a scene is captured in a form of an image. In operation 406, the EBR determiner 152 may determine the EBR of the camera 140 and may provide the electronic device 100 with the EBR. In operation 408, the EBR and the captured image frame are provided as an input to the pre-trained CNN 156. In operation 410, the pre-trained CNN 156 calculates and provides the plurality of parameters associated with the optimal exposure and the optimal mean pixel brightness as an output.

In operation 412, the camera 140 again captures the image by using the determined optimal exposure and displays the image on a display of the electronic device 100.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like.

Figure 5:
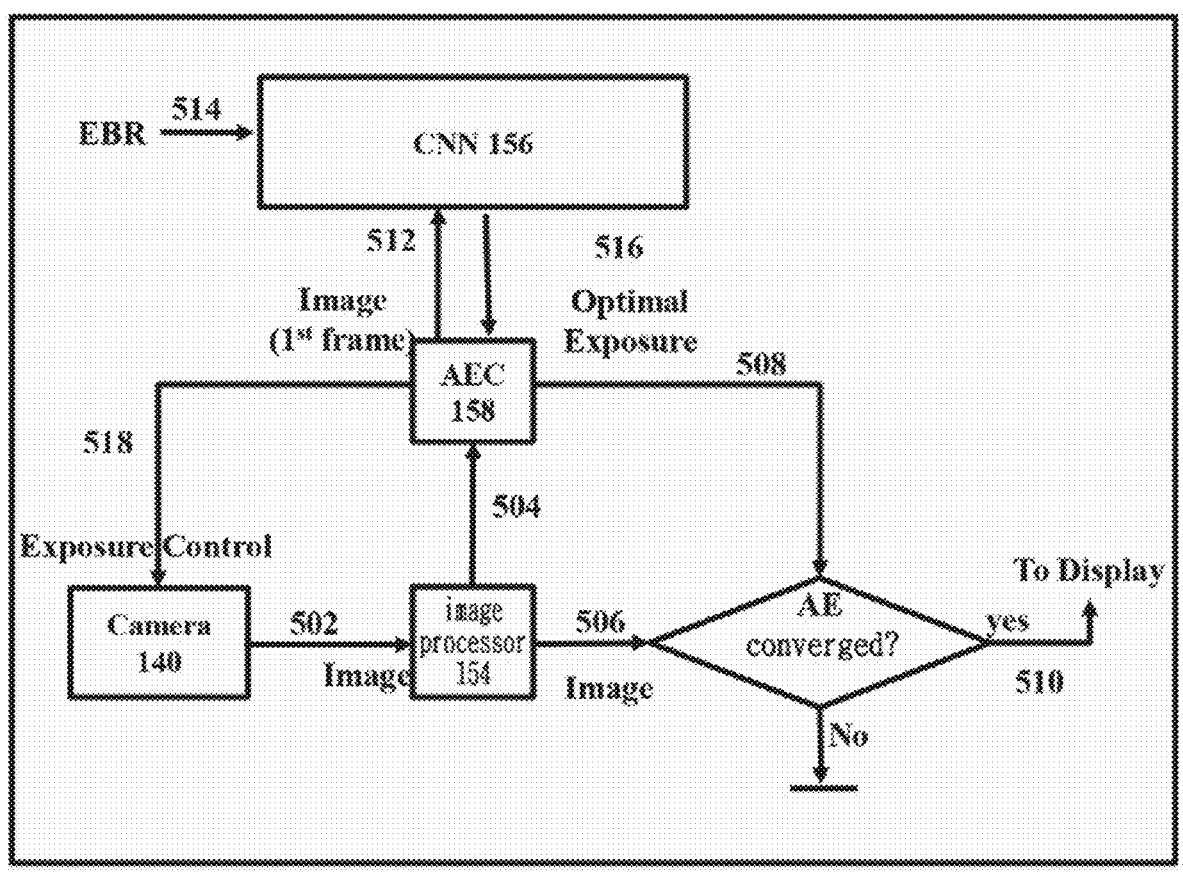
FIG. 5 is a flow diagram, illustrating a structure and a method of reducing a camera launch time, according to an embodiment.

FIG. 5 is a flow diagram, illustrating a structure and a method of reducing a camera launch time, according to an embodiment.

As seen in FIG. 5, the camera 140 captures an image and sends the image to the image processor 154 in operation 502. In an embodiment the image captured by the camera 140 is a raw image (e.g., an unprocessed image). The image processor 154 processes the image. The processed image is sent to an Automatic Exposure (AE) converged block in operation 506 and simultaneously to the AEC 158 in operation 504.

In an embodiment, the camera 140 may directly send the captured image to the AEC 158 and the AE converged block.

The AEC 158 determines whether the image received by the AEC 158 is captured with the optimal exposure or not. If the image is captured with the optimal exposure then the AEC 158 sends a signal to the AE converged block that the image is captured with the optimal exposure, in operation 508. The AE converged block, upon on receiving the signal from the AEC 158, confirms that the image is captured with the optimal exposure and displays the image in operation 510, and otherwise holds off displaying the image.

In another embodiment if the image is not captured with the optimal exposure then the AEC 158 sends the image to the CNN 156, in operation 512. The CNN 156 also receives the EBR of the camera 140 in operation 514 and determines the optimal exposure for capturing the image. The optimal exposure determined by the CNN 156 is then sent to the AEC 158, in operation 516. The AEC 158 then sends the optimal exposure to the camera 140 in operation 518, for capturing the image with the optimal exposure which is displayed by the AE converged block.

Thus as seen above, the optimal exposure is determined using only a single image or a single image frame. The second image is captured with the optimal exposure determined by the CNN 156. Thus, the launch time of the camera is significantly reduced. An AEC in the related art continues to check all the exposure values supported by a camera for determining the optimal exposure which consumes a number of images or frames captured by the camera, thereby increasing the camera launch time.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like.

Figure 6:
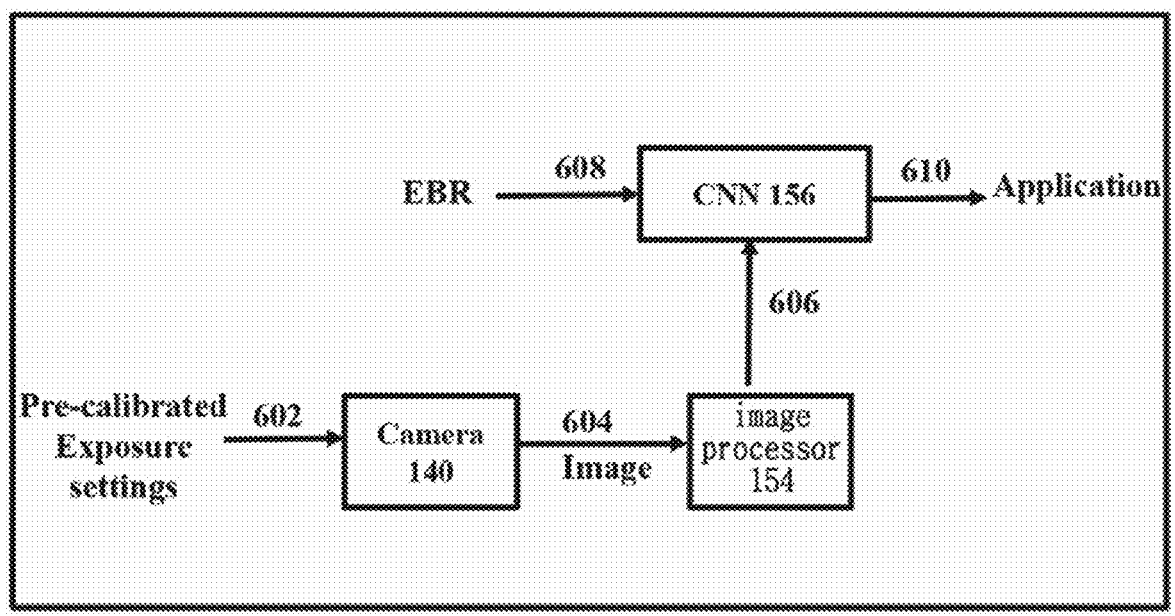
FIG. 6 is a flow diagram, illustrating a structure and a method of determining brightness for any random scene, by capturing an image of the scene using the camera, according to an embodiment.

FIG. 6 is a flow diagram, illustrating a structure and a method of determining brightness for any random scene using a single frame, according to an embodiment.

As seen in FIG. 6 in operation 602, pre-calibrated fixed exposure settings are applied to the camera 140. In operation 604, the image captured by the camera 140 with the pre-calibrated fixed exposure setting is provided to the image processor 154. In operation 606, the image processor 154 processes the image and provides the processed image to the CNN 156. In operation 608, the CNN 156 receives the EBR of the camera 140. In an embodiment, the EBR may be determined by the EBR determiner 152 or may have been already determined by another camera and received by the CNN 156.

In operation 610, the CNN 156 determines the optimal MPB as discussed in explanation of FIG. 3. Thus in the present embodiment, the optimal MPB may be determined without using the AEC 156. Hence the hardware units required for the AEC 156 are omitted. Further, there is also an advantage of saving the battery power required for processing the AEC 156.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like.

Figure 7:
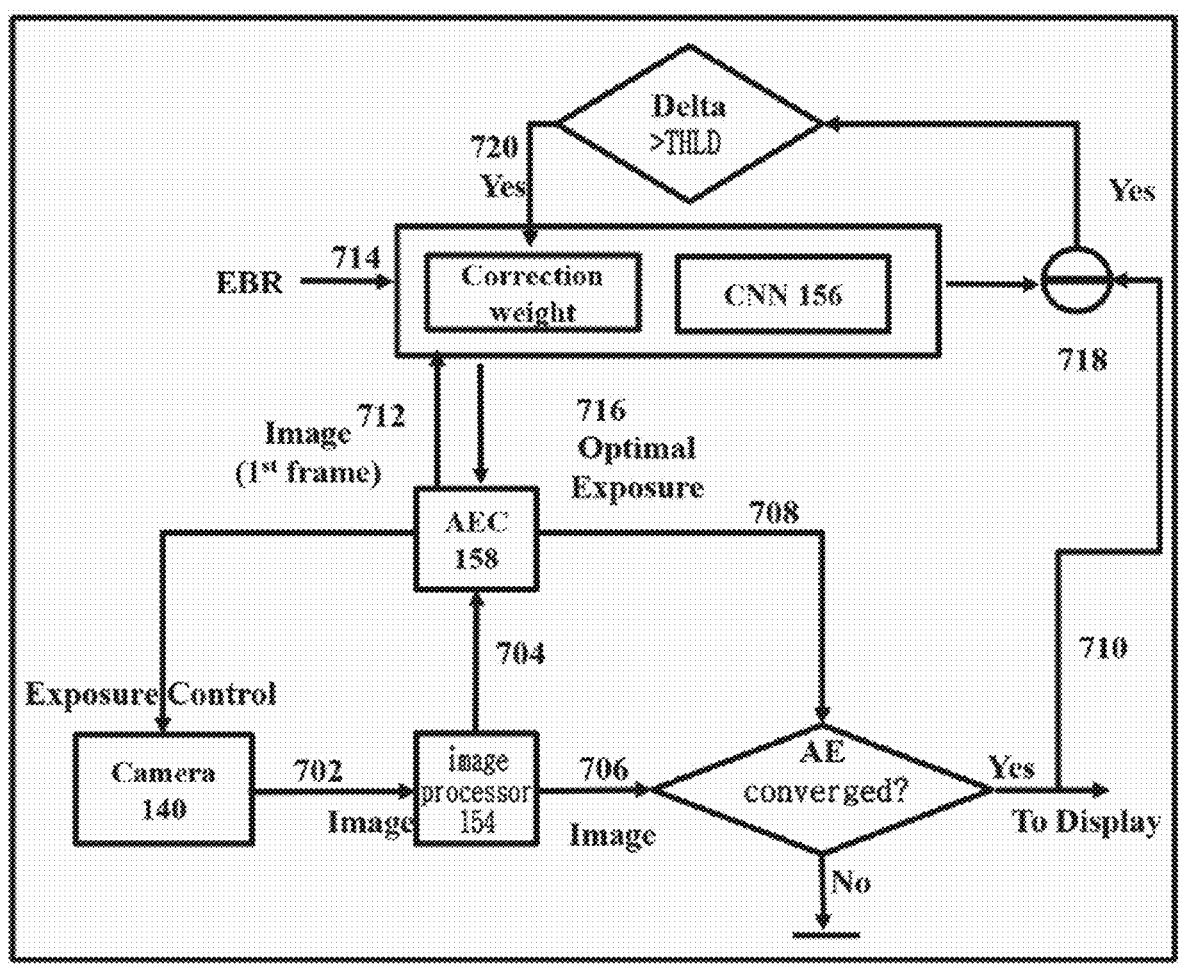
FIG. 7 is a flow diagram, illustrating a method of operating the exposure and brightness controller according to an embodiment.

FIG. 7 is a flow diagram, illustrating a method of improving the result of the exposure and brightness controller 150, according to an embodiment.

The CNN 156 may determine the optimal exposure using a single image or a single frame. Using the optimal exposure, the camera 140 captures the image and from the captured image the optimal mean pixel brightness of the scene in the image is determined.

The method illustrated in FIG. 7 is provided for improving the performance of the CNN 156 after at least 6-7 frames captured by the camera 140.

In operation 702, the camera 140 captures an image frame and sends the image to the image processor 154. The image captured by the camera 140 is a sixth or seventh frame. In an embodiment, the image captured by the camera 140 is a raw image. The image processor 154 processes the image. The processed image is sent to an AE converged block in operation 706 and simultaneously to the AEC 158 in operation 704.

In an embodiment, the camera may directly send the captured images to the AEC 158 and the AE converged block.

The AEC 158 determines whether the image received by the AEC 158 is captured with the optimal exposure or not. If the image is captured with the optimal exposure then the AEC 158 sends a signal to the AE converged block that the image is captured with the optimal exposure, in operation 708. The AE converged block, upon receiving the signal from the AEC 158, confirms that the image is captured with the optimal exposure and displays the image in operation 710, and otherwise holds off displaying the image.

In another embodiment if the image is not captured with the optimal exposure then the AEC 158 sends the image to the CNN 156 in operation 712. The CNN 156 also receives the EBR of the camera 140 in operation 714 and determines the optimal exposure for capturing the image. The optimal exposure determined by the CNN 156 is then sent to the AEC 158, in operation 716. The AEC 158 then sends the optimal exposure to the camera 140 for capturing the image with the optimal exposure which is displayed by the AE converged block. The above process is repeated for 6-7 frame till a point when the AEC 158 is able to determine the optimal exposure on its own without the CNN 156. Once the AEC 158 determines the optimal exposure, then in operation 718, the optimal exposure determined by the AEC 158 is compared with the optimal exposure determined by the CNN 156.

The difference between the optimal exposure determined by the AEC 158 and the exposure determined by the CNN 156 is referred to as delta (δ). The delta is then compared with a pre-defined threshold value. If the delta value is greater than the threshold value then the delta value is sent to a weight correction block for correcting the CNN 156 in operation 720. The weight correction block corrects the weights that are applied to the CNN 156.

In another embodiment, if the delta value is less than or equal to the pre-defined threshold value then the CNN 156 is not modified with the weight correction block.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like.

Figure 8:
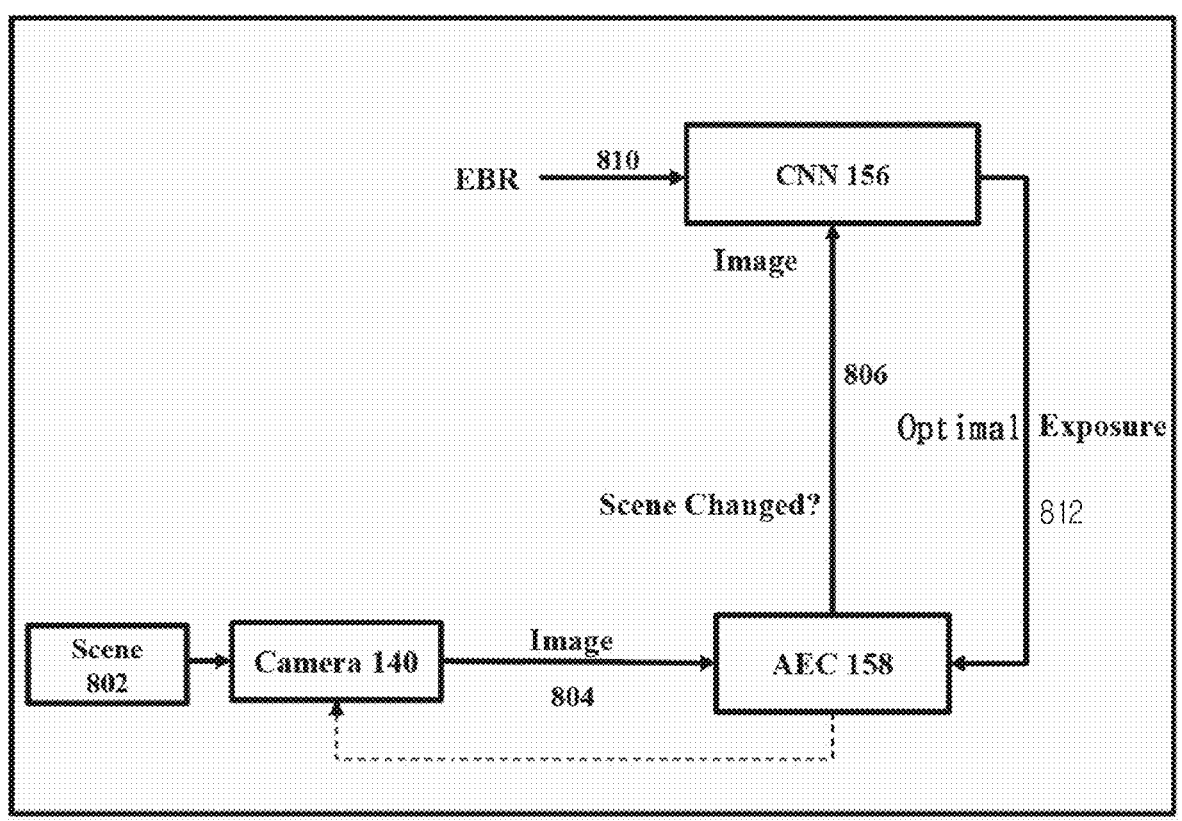
FIG. 8 is a flow diagram, illustrating a method of maintaining an optimal exposure when a sudden change occurs in scene conditions according to an embodiment.

FIG. 8 is a schematic diagram, illustrating a method for maintaining the determined optimal exposure when the scene is changed, according to an embodiment.

As seen in FIG. 8, a video frame of the scene 802 is captured by the camera 140. The frame is then sent to the AEC 158 in operation 804. The AEC 158 determines that the lighting conditions in the scene 802 is changed and sends the captured image for determining the optimal exposure for capturing the scene 802 to the CNN 156, in operation 806. The CNN 156 also receives EBR of the camera 140 at 810. The CNN 156 then determines the optimal exposure and forwards the same to the AEC 158, in operation 812. The AEC 158 then sends the determined optimal exposure to the camera 140 for capturing the scene with the optimal exposure.

As seen above, the method according to the embodiment of the present disclosure requires a less number of frames for maintaining the optimal exposure even when there is a sudden change in the scene such as the lighting condition of the scene. A conventional method uses a large number of frames for determining the change in the scene condition and determining the optimal exposure for the changed scene. Thus the embodiments of the present application provide an advantage of reducing the number of frames for determining optimal exposure in a case of a sudden change of a scene condition, thereby reducing the number of bad quality frames.

The principal object of the embodiments herein is to provide a method and system for determining optimal exposure and scene brightness efficiently and thereby reducing a camera launch time to capture camera moments quickly.

Another object of the embodiment herein is to estimate the optimal exposure in case of sudden scene and/or lighting condition change for reducing the cycles of the image processor and the exposure and scene brightness controller.

Another object of the embodiment herein is to reduce the number of image frames required for determining optimal exposure and thereby reducing the camera open time and increasing the camera and battery life of the camera.

Another object of the embodiment herein is to train a convolution neural network (CNN) with data sets including an Exposure Brightness Response (EBR) for determining the plurality of optimal exposure parameters and the scene brightness.

Another object of the embodiment herein is to estimate brightness of any random scene, by capturing an image of the scene and processing the image.

Another object of the embodiment herein is to improve quality of an exposure and scene brightness controller.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of controlling a camera in an electronic device, the method comprising:
   receiving a camera start command to activate the camera of the electronic device;
   capturing an image frame of a scene by the camera;
   obtaining an Exposure Brightness Response (EBR) of the camera;
   providing the EBR and the image frame as an input to a pre-trained neural network specific to the camera; and
   determining a plurality of exposure parameters of the camera and a mean pixel brightness (MPB) by using the pre-trained neural network.

2. The method as claimed in claim 1, further comprising:
   applying the plurality of exposure parameters to the camera for capturing a next image frame.

3. The method as claimed in claim 1, further comprising:
   determining the EBR before receiving the camera start command.

4. The method as claimed in claim 3, wherein the determining the EBR comprises:
   applying, to the camera, each of a plurality of exposure values supported by the camera;
   capturing an image for each of the plurality of exposure values applied to the camera;
   determining a mean pixel brightness (MPB) value for the image captured for each of the plurality of exposure values applied to the camera; and
   determining the EBR of the camera as a function of the plurality of exposure values applied to the camera and the corresponding MPB value for each captured image.

5. The method as claimed in claim 1, wherein the plurality of exposure parameters comprise a shutter speed of the camera, an analog and digital gain of the camera, and a lens aperture of the camera.

6. The method as claimed in claim 1, wherein light sensing properties (LSP) of the camera are provided as the input to the pre-trained neural network to determine the plurality of exposure parameters and the MPB.

7. The method as claimed in claim 6, wherein the LSP comprises at least one of a refractive index of a lens of the camera, a pixel size of an image sensor of the camera, a signal-to-noise ratio (SNR) of an analog-to-digital converter (ADC) in the camera, a minimum exposure and a maximum exposure of the camera, a minimum international organization for standardization (ISO) value and a maximum ISO value of the camera, a minimum aperture and a maximum aperture of the camera, and an initial exposure applied to the camera.

8. The method as claimed in claim 1, further comprising:
   determining the plurality of exposure parameters by using an Automatic Exposure Control (AEC) method;
   determining a difference value between the plurality of exposure parameters determined by the pre-trained neural network and the plurality of exposure parameters determined by using the AEC method;
   determining whether the difference value is greater than a pre-defined threshold value; and
   adjusting the pre-trained neural network to adjust the plurality of exposure parameters based on determining that the difference value is greater than the pre-defined threshold value.

9. An electronic device for determining an optimal camera exposure, the electronic device comprising:
   at least one memory configured to store one or more computer readable instructions;
   a camera configured to:
     receive a camera start command to activate the camera, and
     capture an image frame of a scene; and
   a processor configured to execute the one or more instructions to:
     obtain an Exposure Brightness Response (EBR) of the camera,
     apply the EBR and the captured image frame to a neural network specific to the camera, and
     determine a plurality of exposure parameters of the camera and a mean pixel brightness (MPB) using the neural network specific to the camera.

10. The electronic device as claimed in claim 9, wherein the processor is further configured to execute the one or more instructions to:
    apply the plurality of exposure parameters to the camera for capturing a next image frame, and
    wherein the camera is further configured to capture the next image frame based on the plurality of exposure parameters.

11. The electronic device as claimed in claim 9, wherein the processor is further configured to execute the one or more instructions to:
    determine the EBR of the camera before receiving the camera start command to activate the camera.

12. The electronic device as claimed in claim 11, wherein the processor is further configured to execute the one or more instructions to:
apply to the camera, each of a plurality of exposure values supported by the camera,
capture an image for each of the plurality of exposure values,
determine a mean pixel brightness (MPB) value for the image captured for each of the plurality of exposure values applied to the camera, and
determine the EBR of the camera as a function of the plurality of exposure values applied to the camera and the corresponding MPB value for each captured image.

13. The electronic device as claimed in claim 9, wherein the plurality of exposure parameters comprises a shutter speed of the camera, an analog and digital gain of the camera and a lens aperture of the camera.

14. The electronic device as claimed in claim 9, wherein the processor is further configured to execute the one or more instructions to:
provide light sensing properties (LSP) of the camera as an input to the pre-trained neural network, and
determine the plurality of exposure parameters and the MPB through the pre-trained neural network.

15. The electronic device as claimed in claim 14, wherein the LSP comprises a refractive index of a lens of the camera, a pixel size of an image sensor of the camera, a signal-to-noise ratio (SNR) of an analog-to-digital converter (ADC) in the camera, a minimum exposure and a maximum exposure of the camera, a minimum international organization for standardization (ISO) value and a maximum ISO value of the camera, a minimum aperture and a maximum aperture of the camera, and an initial exposure applied to the camera.

16. The electronic device as claimed in claim 9, wherein the processor is further configured to execute the one or more instructions to:
determine the plurality of exposure parameters by using an Automatic Exposure Control (AEC) method,
determine a difference value between the plurality of exposure parameters determined by the pre-trained neural network and the plurality of exposure parameters determined by using the AEC method,
determine whether the difference value is greater than a pre-defined threshold value, and
adjust the pre-trained neural network to adjust the plurality of exposure parameters based on determining that the difference value is greater than the pre-defined threshold value.

17. An electronic device for determining an optimal camera exposure, the electronic device comprising:
a camera configured to capture an image frame of a scene;
at least one memory configured to store one or more computer readable instructions, and a convolutional neural network that is trained based on a configuration of the camera; and
a processor configured to execute the one or more instructions to:
obtain an Exposure Brightness Response (EBR) of the camera,
determine a plurality of first exposure parameters of the camera through the convolutional neural network by inputting the EBR and the captured image frame to the convolutional neural network,
determine a plurality of second exposure parameters of the camera by applying an Automatic Exposure Control (AEC) method to the captured image frame,
adjust the convolutional neural network in response to determining a difference between the plurality of first exposure parameters and the plurality of second exposure parameters is greater than a pre-defined threshold value, and
determine a plurality of third exposure parameters through the adjusted convolutional neural network, as optimal exposure parameters.

* * * * *